(12) United States Patent
Gersman et al.

(10) Patent No.: US 12,286,529 B2
(45) Date of Patent: Apr. 29, 2025

(54) TIRE WITH TREAD CONTAINING VEGETABLE OIL EXTENDED HIGH TG STYRENE/BUTADIENE ELASTOMER AND TRACTION RESIN

(71) Applicant: The Goodyear Tire & Rubber Company, Akron, OH (US)

(72) Inventors: Michael Lawrence Gersman, Cleveland, OH (US); Nihat Ali Isitman, Hudson, OH (US); Philip Jordan Young, Twinsburg, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 197 days.

(21) Appl. No.: 17/095,969

(22) Filed: Nov. 12, 2020

(65) Prior Publication Data

US 2022/0145063 A1 May 12, 2022

(51) Int. Cl.
*C08L 47/00* (2006.01)
*B60C 1/00* (2006.01)
*B60C 11/00* (2006.01)

(52) U.S. Cl.
CPC ............ *C08L 47/00* (2013.01); *B60C 1/0016* (2013.01); *B60C 11/0008* (2013.01); *B60C 2011/0025* (2013.01); *C08L 2205/025* (2013.01); *C08L 2205/035* (2013.01)

(58) Field of Classification Search
CPC ............ C08L 47/00; C08L 2205/025; C08L 2205/035; C08L 9/06; C08L 9/00; C08L 25/16; B60C 1/0016; B60C 11/0008; B60C 2011/0025; B60C 1/00; C08K 5/103; C08K 3/36; C08K 3/04; C08K 5/09; C08K 3/22; C08K 3/06; C08K 5/548
See application file for complete search history.

(56) References Cited

U.S. PATENT DOCUMENTS

| | | | |
|---|---|---|---|
| 7,335,692 B2 | 2/2008 | Vasseur et al. | |
| 9,416,259 B2 | 8/2016 | Mathey et al. | |
| 9,846,954 B2 | 12/2017 | Stubblefiled et al. | |
| 10,160,847 B2 | 12/2018 | Lesage et al. | |
| 10,364,342 B2 | 7/2019 | Brace | |
| 10,385,192 B2 | 8/2019 | Brace | |
| 10,471,775 B2 | 11/2019 | Fugier et al. | |
| 10,519,300 B2 | 12/2019 | Brace | |
| 2015/0283854 A1 | 10/2015 | Saintigny et al. | |
| 2017/0145195 A1* | 5/2017 | Isitman | C08L 9/06 |
| 2018/0148567 A1* | 5/2018 | Papakonstantopoulos | C08L 9/06 |
| 2018/0163028 A1 | 6/2018 | Brace | |
| 2018/0163029 A1* | 6/2018 | Brace | C08L 91/00 |
| 2019/0225778 A1* | 7/2019 | Weydert | C08K 5/11 |
| 2020/0087489 A1 | 3/2020 | Isitman | |

FOREIGN PATENT DOCUMENTS

EP  3478515 B1  10/2020

OTHER PUBLICATIONS

European Search Report for Serial No. EP21207392 dated Mar. 22, 2022.

* cited by examiner

*Primary Examiner* — Doris L Lee
(74) *Attorney, Agent, or Firm* — Mandy B. Willis

(57) ABSTRACT

This invention relates to a tire with high performance tread of rubber composition for promoting tread durability and traction. For such purpose, a tread rubber composition is provided which contains a high Tg solvent solution polymerization prepared styrene/butadiene elastomer (SSBR) together with precipitated silica reinforcement and traction resin. The invention includes extension of the uncured high Tg SSBR by triglyceride vegetable oil instead of petroleum based oil.

10 Claims, No Drawings

TIRE WITH TREAD CONTAINING VEGETABLE OIL EXTENDED HIGH TG STYRENE/BUTADIENE ELASTOMER AND TRACTION RESIN

FIELD OF THE INVENTION

This invention relates to a tire with high performance tread of rubber composition for promoting tread durability and traction. For such purpose, a tread rubber composition is provided which contains a high Tg solvent solution polymerization prepared styrene/butadiene elastomer (SSBR) together with precipitated silica reinforcement and traction promoting resin. The invention includes extension of the uncured high Tg SSBR with triglyceride vegetable oil.

BACKGROUND OF THE INVENTION

Tires are sometimes desired which have high performance treads which promote traction and durability.

It is desired to provide tread rubber containing a high Tg (high glass transition temperature property) solvent solution polymerization prepared styrene/butadiene rubber (SSBR) to promote wet traction for the tread rubber composition.

For such purpose, it is desired for the SSBR to have a high Tg of at least −20° C. and desirably in a range of from about −20° C. to about +10° C. It is desired for the high Tg SSBR to have a bound styrene content in a range of from about 25 to about 50, alternately from about 25 to about 40, percent. It is further desired for the high Tg SSBR to have a vinyl 1,2-content based on its polybutadiene portion of at least about 10, alternately in a range of from about 10 to about 80, or alternatively in a range of from about 20 to about 70, percent.

Reinforcing filler for such rubber composition is desired to be comprised of a combination of rubber reinforcing carbon black and precipitated silica (amorphous synthetic precipitated silica) composed primarily of precipitated silica, desirably at least about 50 to about 100, alternately about 70 to about 99 weight percent precipitated silica. The reinforcing filler is to contain silica coupler (silica coupling agent) for precipitated silica.

Historically, such high Tg SSBR's may be extended with petroleum based rubber processing oil at the SSBR manufacturing facility by blending the petroleum oil with an SSBR polymerizate (polymerization cement comprised of the high Tg SSBR and solvent used for its preparation by polymerization of styrene and 1,3-butadiene monomers) prior to recovery of the high Tg SSBR from its polymerizate and thereby prior to blending the high Tg SSBR with rubber compounding ingredients at a tire tread manufacturing facility, although additional petroleum based rubber processing oil may thereafter be blended with the high Tg SSBR containing rubber composition which may sometimes be referred to as "free addition" of the petroleum based oil instead of such "extending" of the high Tg SSBR.

The term "extending", as above indicated, is used to refer to (to describe) pre-blending of the petroleum based oil with the high Tg SSBR (a high viscosity, high molecular weight SSBR) in a relatively low viscosity solvent based cement form of the SSBR. A composite of the petroleum based oil and SSBR is thereafter recovered from the solvent cement (by removing the solvent) as a petroleum based oil "extended" SSBR. The oil extended high Tg SSBR is provided in contrast to free addition of the petroleum based oil to a significantly higher viscosity high Tg SSBR or to the high Tg SSBR containing rubber composition by addition of the petroleum oil to a rubber mixer.

For this invention, it is desired to provide a rubber composition comprised of cis 1,4-polybutadiene rubber and the high Tg SSBR to promote the tire tread traction yet it is also desired to reduce the Tg of the rubber composition to promote the tread traction at lower temperatures by thereby reducing its stiffness as may be evidenced by a reduction of its storage modulus (E'). For such reduction in Tg of the rubber composition, it desired to evaluate providing the high Tg SSBR in a form of an extended SSBR with vegetable triglyceride oil in a sense of pre-blending the vegetable oil with the high Tg SSBR before recovery from its polymerization cement, instead of the SSBR being extended with petroleum based oil, to thereby evaluate promoting a lower Tg for the rubber composition containing the high Tg SSBR to thereby promote a reduction of its stiffness (e.g. lower storage modulus G' and higher tan delta values for the rubber composition).

Historically, a vegetable oil such as for example soybean oil, or soy oil, has been used for mixing with various rubber compositions by free oil addition to the rubber composition rather than soy oil extension of the elastomer by addition to its cement at its point of manufacture. For example, and not intended to be limiting, see U.S. Pat. Nos. 7,919,553, 8,100,157 and 8,022,136. Soybean oil has also been used for oil extending emulsion polymerization prepared and organic solution polymerization prepared styrene/butadiene elastomers for some circumstances. For example, see U.S. Pat. No. 8,044,118 and U.S. Patent Publication No. 2013/0289183.

In the description of this invention, the terms "compounded" rubber compositions and "compounds"; where used refer to rubber compositions which have been compounded, or blended, with appropriate rubber compounding ingredients. The terms "rubber" and "elastomer" may be used interchangeably unless otherwise indicated. The amounts of materials are usually expressed in parts of material per 100 parts of rubber by weight (phr).

SUMMARY AND PRACTICE OF THE INVENTION

In accordance with this invention, a pneumatic tire is provided having a rubber tread having a running surface intended to be ground-contacting, where said tread is comprised of a rubber composition comprised of, based on parts by weight per 100 parts by weight elastomer (phr):

(A) conjugated diene-based elastomers comprised of:
(1) from about 25 to 60 phr of high Tg styrene/butadiene elastomer (high Tg SSBR) pre-oil extended with vegetable triglyceride oil, wherein said high Tg SSBR has a Tg in a range of from about −20° C. to about +10° C. and a bound styrene content in a range of from about 25 to about 50 percent,
(2) from 75 to 40 phr of at least one additional conjugated diene-based elastomer comprised of at least one of polybutadiene and cis 1,4-polyisoprene rubber (natural rubber or synthetic polyisoprene),
(B) about 50 to about 200, alternately from about 70 to about 140, phr of reinforcing filler comprised of a combination of rubber reinforcing carbon black and precipitated silica where the reinforcing filler is comprised of from about 50 to about 100 weight percent precipitated silica, where said reinforcing filler further contains silica coupler (silica coupling agent) for said precipitated silica having a moiety reactive with hydroxyl groups on said precipitated silica and another different moiety interactive with said diene-based elastomers; and (C) about 5 to about 50, alternately about 10 to about 50, phr of traction promoting resin (e.g. traction between said tread and ground) comprised of at least one of styrene/alphamethylstyrene copolymer resin, terpene-phenol resin, coumarone-indene resin, petroleum hydrocarbon resin, terpene polymer resin, and rosin derived resin and modified rosin acid resin, desirably comprised of styrene/alphamethylstyrene resin.

In one embodiment, the high Tg SSBR is extended with about 5 to about 40, alternately about 5 to about 30, parts by weight vegetable triglyceride oil per 100 parts by weight of said high Tg SSBR.

In one embodiment, said high Tg SSBR has a vinyl 1,2-content, based on its polybutadiene component, in a range of from about 10 to about 80, alternately about 20 to about 70, percent.

In one embodiment, said rubber composition contains from zero to about 20, alternately up to about 10 or up to about 20, phr of freely added vegetable oil (in contrast to containing vegetable based oil extended high Tg SSBR).

In one embodiment said traction promoting resin is comprised of at least one of said styrene/alphamethylstyrene resin, rosin acid resin, coumarone-indene resin and terpene-phenol resin, desirably styrene/alphamethylstyrene resin.

In one embodiment, said triglyceride vegetable oil is at least one of sunflower oil, rapeseed oil, canola oil, palm oil, and soybean oil, desirably comprised of at least one of soybean oil and sunflower oil.

In one embodiment, said high Tg SSBR is an end-functionalized high Tg SSBR with at least one functional group reactive with hydroxyl groups on said precipitated silica where said functional groups are comprised of at least one of alkoxy, amine, siloxy and thiol groups.

In one embodiment, said high Tg SSBR or end functionalized high Tg SSBR is tin or silicon coupled.

In further accordance with this invention, said tire tread is provided as a sulfur cured rubber composition.

Various suitable solvent solution polymerization methods for preparing a high Tg SSBR by co-polymerizing styrene and 1,3-butadiene monomers are known in the art, for example, and without an intended limitation, as may be disclosed in one or more U.S. Pat. Nos. 4,843,120; 5,137,998; 5,047,483; 5,272,220; 5,239,009; 5,061,765; 5,405,927; 5,654,384; 5,620,939; 5,627,237; 5,677,402; 6,103,842; and 6,559,240; all of which are fully incorporated herein by reference.

The precipitated silica may, for example, be characterized by having a BET surface area, as measured using nitrogen gas, in the range of, for example, about 40 to about 600, and more usually in a range of about 50 to about 300, square meters per gram. The BET method of measuring surface area might be described, for example, in the *Journal of the American Chemical Society*, Volume 60, as well as ASTM D3037.

The precipitated silica may, for example, also be characterized by having a dibutylphthalate (DBP) absorption value, for example, in a range of about 100 to about 400, and more usually in a range of from about 150 to about 300, cc/100 g.

Various commercially available precipitated silicas may be used, such as, and not intended to be limiting, silicas from PPG Industries under the Hi-Sil trademark with designations 210, 243, etc.; silicas from Solvay with, for example, designations of Zeosil 1165 MP and Zeosil 165GR, silicas from Evonik with, for example, designations VN2 and VN3 and chemically treated precipitated silicas (e.g. composite of pre-hydrophobated precipitated silica) such as for example Agilon™ 400 from PPG Industries.

Representative examples of rubber reinforcing carbon blacks are, for example, and not intended to be limiting, those with ASTM designations of N110, N121, N220, N231, N234, N242, N293, N299, S315, N326, N330, N332, N339, N343, N347, N351, N358, N375, N539, N550, N582, N630, N642, N650, N683, N754, N762, N765, N774, N787, N907, N908, N990 and N991. Such rubber reinforcing carbon blacks may have iodine absorptions ranging from, for example, 9 to 145 g/kg and DBP numbers ranging from 34 to 150 cc/100 g.

The silica coupling agent(s) which may be provided with the precipitated silica for the rubber composition, may be comprised of, for example, (A) bis(3-trialkoxysilylalkyl) polysulfide containing an average of connecting sulfur atoms in its polysulfide bridge in range of from about 2 to about 4, alternately from about 2 to about 2.6, sulfur atoms, or (B) a combination of bis(3-trialkoxysilylproyl) polysulfides having an average of connecting sulfur atoms in their polysulfide bridges of:
(1) from about 2 to about 2.6, and
(2) from about 3.2 to about 4, (C) an organoalkoxymercaptosilane, or (D) a combination of said bis(3-trialkoxysilylalkyl) polysulfide and organoalkoxymercaptosilane silica coupling agents.

Representative of such bis(3-trialkoxysilylalkyl) polysulfide is bis(3-triethoxysilylpropyl) polysulfide.

Alternately, the precipitated silica may be pre-treated (pre-hydrophobated) with at least one of such silica coupling agent to form a composite thereof prior to addition to the rubber composition.

It is readily understood by those having skill in the art that the vulcanizable rubber composition would be compounded by methods generally known in the rubber compounding art, such as, for example, mixing various additional sulfur-vulcanizable elastomers with said SSBR composite and various commonly used additive materials such as, for example, sulfur and sulfur donor curatives, sulfur vulcanization curing aids, such as activators and retarders and processing additives, resins including tackifying resins and plasticizers, petroleum based or derived process oils as well as vegetable triglyceride oil in addition to said triglyceride oil extended SSBR, fillers such as rubber reinforcing fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Usually it is desired that the sulfur-vulcanizing agent is elemental sulfur. The sulfur-vulcanizing agent may be used in an amount ranging, for example, from about 0.5 to 8 phr, with a range of from 1.5 to 6 phr being often preferred. Typical amounts of processing aids comprise about 1 to about 50 phr. Additional process oils, if desired, may be added during compounding in the vulcanizable rubber composition in addition to the extending soybean oil contained in the soybean oil extended SSBR. Typical amounts of antioxidants may comprise, for example, about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants may comprise, for example, about 1 to 5 phr. Typical amounts of fatty acids, if used, which can include stearic acid comprise about 0.5 to about 3 phr. Typical amounts of zinc oxide may comprise, for example, about 2 to about 5 phr. Typical amounts of waxes comprise about 1 to about 5 phr. Often microcrystalline waxes are used. Typical amounts of peptizers, when used, may be used in amounts of, for example, about 0.1 to about 1 phr. Typical peptizers may be, for example, pentachlorothiophenol and dibenzamidodiphenyl disulfide.

Sulfur vulcanization accelerators are used to control the time and/or temperature required for vulcanization and to improve the properties of the vulcanizate. In one embodiment, a single accelerator system may be used, i.e., primary accelerator. The primary accelerator(s) may be used in total amounts ranging, for example, from about 0.5 to about 4, sometimes desirably about 0.8 to about 1.5, phr. In another embodiment, combinations of a primary and a secondary accelerator might be used with the secondary accelerator being used in smaller amounts, such as, for example, from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Often desirably the primary accelerator is a sulfenamide. If a second accelerator is used, the secondary accelerator is often desirably a guanidine such as for example a diphenylguanidine, a dithiocarbamate or a thiuram compound.

The mixing of the vulcanizable rubber composition can be accomplished by methods known to those having skill in the rubber mixing art. For example, the ingredients are typically mixed in at least two stages, namely at least one non-productive stage followed by a productive mix stage. The final curatives, including sulfur-vulcanizing agents, are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Vulcanization of the pneumatic tire of the present invention may be generally carried out at conventional temperatures in a range of, for example, from about 150° C. to 200° C. Any of the usual vulcanization processes may be used such as heating in a press or mold with superheated steam or hot air. Such tires can be built, shaped, molded and cured by various methods which are known and will be readily apparent to those having skill in such art.

The following examples are presented for the purposes of illustrating and not limiting the present invention. The parts and percentages are parts by weight, usually parts by weight per 100 parts by weight rubber (phr), unless otherwise indicated.

EXAMPLE 1

In this example, four rubber compositions are evaluated. Rubber compounds were mixed in a multistep mix procedure following the formulations as given in Table 1, with all amounts in phr. Mixed samples were cured and tested for various physical properties, as given in Table 2. In Table 2 various physical properties of the rubber compositions of Control rubber Sample C-1 and Experimental rubber Samples E-1, E-2 and E-3 are reported. The rubber samples were cured at a temperature of about 170° C. for about 10 minutes.

TABLE 1

|  | C-1 | E-1 | E-2 | E-3 |
|---|---|---|---|---|
| ESBR[1] | 60 | 0 | 0 | 0 |
| Polybutadiene[2] | 30 | 40 | 45 | 45 |
| Natural Rubber | 10 | 10 | 0 | 0 |
| SSBR[3] | 0 | 50 | 55 | 55 |
| Soybean oil (as extension oil in SSBR) | 0 | 10 | 11 | 11 |
| Soybean oil (freely added to mixer) | 0 | 12.5 | 5.5 | 0 |
| Petroleum oil (as extension in ESBR) | 22.5 | 0 | 0 | 0 |
| Hydrocarbon traction resin[4] | 24 | 24 | 30 | 30 |
| Precipitated silica | 80 | 80 | 80 | 80 |
| Silane coupling agent | 7.4 | 7.4 | 6.4 | 6.4 |
| Carbon black | 11 | 11 | 10 | 10 |
| Antidegradants | 4.5 | 4.5 | 4.5 | 4.5 |
| Stearic acid | 3 | 3 | 3 | 3 |
| Sulfur | 1.2 | 1.5 | 1.4 | 1.4 |
| Zinc oxide | 1.75 | 1.75 | 1.75 | 1.75 |
| Cure Accelerators | 3.5 | 4.0 | 3.9 | 3.9 |

[1]Emulsion polymerization prepared styrene/butadiene elastomer (ESBR), extended with 37.5 parts by weight petroleum based rubber processing oil per 100 parts by weight of SSBR, where the ESBR has a moderate Tg of about −55° C. as PLF1763.

[2]Cis 1,4-polybutadiene rubber having a cis 1,4-content of at least about 95 percent and a Tg of about −104° C. as BUD1223™ from The Goodyear Tire & Rubber Company prepared by neodymium based catalysis of 1,3-butadiene monomer.

[3]Solution polymerization prepared styrene/butadiene elastomer (SSBR), extended with 20 parts by weight soybean oil per 100 parts by weight of SSBR, where the SSBR has a high Tg of about −14° C. and a styrene content of about 33 percent and a vinyl 1,2-content based on its polybutadiene component of about 54 percent as SLF33SOY from The Goodyear Tire & Rubber Company. The SSBR is reported in Table 1 in terms of the dry elastomer SSBR with the extension soybean oil reported on a separate line.

[4]Traction promoting resin as styrene-alphamethylstyrene copolymer having a softening point in a range of about 80° C. to 90° C. (ASTM E28) obtained as Sylvatraxx4401 from Arizona Chemicals.

TABLE 2

| Sample | C-1 | E-1 | E-2 | E-3 |
|---|---|---|---|---|
| Wet predictive properties | | | | |
| Rebound at 0° C. (lower is better) | 18 | 15 | 11 | 11 |
| TanDelta at 0° C. (higher is better) | 0.40 | 0.40 | 0.55 | 0.58 |
| Winter predictive properties | | | | |
| G' at −20° C. (MPa) (lower is better) | 14.0 | 12.4 | 19.6 | 27.8 |
| Lab abrasion properties | | | | |
| DIN volume loss (lower is better) | 76 | 80 | 83 | 71 |

E-1 vs. C-1

When replacing ESBR with a higher Tg SSBR for improved wet performance, use of low Tg soybean oil in place of petroleum oil allows for simultaneous improvement in winter predictive properties without a significant change in lab abrasion.

E-2 and E-3 vs. E-1

Reducing soybean oil loading while holding all other ingredients constant results in a substantial decline in predicted winter performance while offering only a slight improvement in predicted wet performance and similar lab abrasion properties.

EXAMPLE 2

In this example, four rubber compositions are evaluated. Rubber compounds were mixed in a multistep mix procedure following the formulations as given in Table 3, with all amounts in phr. Mixed samples were cured and tested for various physical properties, as given in Table 4. In Table 2 various physical properties of the rubber compositions of Control rubber Sample C-2 and Experimental rubber Samples E-4 and E-5 are reported. The rubber samples were cured at a temperature of about 170° C. for about 10 minutes.

TABLE 3

| | C-2 | E-4 | E-5 |
|---|---|---|---|
| ESBR[1] | 35 | 0 | 0 |
| Polybutadiene[2] | 45 | 50 | 55 |
| Natural Rubber | 20 | 20 | 15 |
| SSBR[3] | 0 | 30 | 30 |
| Soybean oil (as extension oil in SSBR) | 0 | 6 | 6 |
| Petroleum oil (as extension in ESBR) | 13 | 0 | 0 |
| Hydrocarbon traction resin[4] | 9 | 9 | 15 |
| Precipitated silica | 70 | 70 | 70 |
| Silane coupling agent | 5.6 | 5.6 | 5.6 |
| Carbon black | 22 | 17 | 17 |
| Antidegradants | 4.5 | 4.5 | 4.5 |
| Stearic acid | 3 | 3 | 3 |
| Sulfur | 1.2 | 1.4 | 1.4 |
| Zinc oxide | 1.75 | 1.75 | 1.75 |
| Cure Accelerators | 2.5 | 2.7 | 2.7 |

[1]Emulsion polymerization prepared styrene/butadiene elastomer (ESBR), extended with 37.5 parts by weight petroleum based rubber processing oil per 100 parts by weight of rubber, where the ESBR has a moderate Tg of about −55° C. and is obtained as PLF1763 from the Goodyear Tire and Rubber Company.

[2]Cis 1,4-polybutadiene rubber having a cis 1,4-content of at least about 95 percent and a Tg of about −104° C. as BUD1223™ from The Goodyear Tire & Rubber Company prepared by neodymium based catalysis of 1,3-butadiene monomer.

[3]Solution polymerization prepared styrene/butadiene elastomer (SSBR), extended with 20 parts by weight soybean oil per 100 parts by weight of SSBR, where the SSBR has a high Tg of about −14° C. and a styrene content of about 33 percent and a vinyl 1,2-content based on its polybutadiene component of about 54 percent as SLF33SOY from The Goodyear Tire & Rubber Company. The SSBR is reported in Table 1 in terms of the dry elastomer SSBR with the extension soybean oil reported on a separate line.

[4]Traction promoting resin as styrene-alphamethylstyrene copolymer having a softening point in a range of about 80° C. to 90° C. (ASTM E28) obtained as Sylvatraxx4401 from Arizona Chemicals.

TABLE 4

| Sample | C-2 | E-4 | E-5 |
|---|---|---|---|
| Wet predictive properties | | | |
| Rebound at 0° C. (lower is better) | 30 | 27 | 24 |
| TanDelta at 0° C. (higher is better) | 0.31 | 0.33 | 0.34 |
| Winter predictive properties | | | |
| G' at −20° C. (MPa) (lower is better) | 14.0 | 14.4 | 14.5 |
| Lab abrasion properties | | | |
| DIN volume loss (lower is better) | 31 | 31 | 31 |

E-4 and E-5 vs. C-2

When replacing ESBR with a higher Tg SSBR for improved wet performance, use of low Tg soybean oil in place of petroleum oil allows for improvement in wet predictive properties without a significant change in winter predictive property and lab abrasion.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pneumatic tire is provided having a rubber tread intended to be ground-contacting, where said tread is comprised of a rubber composition comprised of, based on parts by weight per 100 parts by weight elastomer (phr):
   (A) conjugated diene-based elastomers comprised of:
      (1) from about 35 to about 45 phr of high Tg styrene/butadiene elastomer (SSBR) pre-extended with vegetable triglyceride oil, wherein said SSBR has a Tg in a range of from about −20° C. to about +10° C. and a bound styrene content in a range of from about 25 to about 50 percent;
      (2) from 50 to 65 phr of at least two additional conjugated diene-based elastomers comprised of polybutadiene and cis 1,4-polyisoprene rubber;
   (B) about 50 to about 200 phr of reinforcing filler comprised of a combination of rubber reinforcing carbon black and precipitated silica where the reinforcing filler is comprised of from about 50 to about 100 weight percent precipitated silica, where said reinforcing filler further contains silica coupler for said precipitated silica having a moiety reactive with hydroxyl groups on said precipitated silica and another different moiety interactive with said diene-based elastomers;

(C) about 5 to about 50 phr of traction promoting resin comprised of at least one of styrene/alphamethylstyrene copolymer resin, terpene-phenol resin, coumarone-indene resin, petroleum hydrocarbon resin, terpene polymer resin, and rosin derived resin and modified rosin acid resin; and (D) less than 5 phr of freely added vegetable oil.

2. The tire of claim 1 where said high Tg SSBR is extended with about 5 to about 40 parts by weight vegetable triglyceride oil per 100 parts by weight of said high Tg SSBR.

3. The tire of claim 1 wherein said vegetable triglyceride oil is soybean oil.

4. The tire of claim 1 wherein said high Tg SSBR has a vinyl 1,2-content in a range of from about 10 to about 80 percent based on butadiene content.

5. The tire of claim 1 wherein said silica coupler is comprised of bis(3-triethoxysilylpropyl) polysulfide having an average of connection sulfur atoms in its polysulfide bridge in a range of from about 2 to about 4 sulfur atoms, or organoalkoxymercaptosilane or combination thereof.

6. The tire of claim 1 wherein said precipitated silica is pre-treated with at least one of said coupling agents.

7. The tire of claim 1 wherein said traction promoting resin for said tread rubber composition is comprised of at least one of said styrene/alphamethylstyrene resin and terpene-phenol resin.

8. The tire of claim 1 where said vegetable triglyceride oil is comprised of at least one of sunflower oil, rapeseed oil, canola oil, palm oil and soybean oil.

9. The tire of claim 1 wherein said SSBR is an end-functionalized styrene/butadiene elastomer with functional groups reactive with hydroxyl groups on said precipitated silica comprised of at least one of alkoxy, amine, siloxy and thiol groups.

10. The tire of claim 1 wherein said SSBR is tin or silicon coupled.

\* \* \* \* \*